United States Patent [19]
Manske

[11] Patent Number: 5,215,378
[45] Date of Patent: Jun. 1, 1993

[54] DUAL TEMPERATURE INDICATOR

[75] Inventor: Wendell J. Manske, Birchwood, Minn.

[73] Assignee: Introtech, Inc., White Bear Lake, Minn.

[21] Appl. No.: 870,281

[22] Filed: Apr. 17, 1992

[51] Int. Cl.⁵ .................. G01K 3/00; G01K 11/00; G01K 11/12; G01K 5/08; G01K 5/20
[52] U.S. Cl. .................. 374/105; 374/106; 374/162; 374/104; 374/201; 374/204; 116/216
[58] Field of Search .............. 374/159, 160, 162, 104, 374/105, 106, 201, 190, 193, 204; 116/207, 218, 217, 216, 219

[56] References Cited

U.S. PATENT DOCUMENTS

| 2,415,309 | 2/1947 | Stone | 374/201 |
|---|---|---|---|
| 3,233,459 | 2/1966 | Gleason et al. | 374/160 |
| 3,717,035 | 2/1973 | Klingler et al. | 374/105 |
| 3,745,831 | 7/1973 | Rothstein et al. | 374/105 |
| 4,083,250 | 4/1978 | Goff et al. | 374/201 |
| 4,457,252 | 7/1984 | Manske | 116/216 |
| 4,457,253 | 7/1984 | Manske | 374/160 |
| 4,647,224 | 3/1987 | Holm et al. | 374/162 |

FOREIGN PATENT DOCUMENTS

| 1964065 | 10/1970 | Fed. Rep. of Germany | 374/201 |
|---|---|---|---|
| 2008720 | 1/1990 | Japan | 374/160 |
| 9119174 | 12/1991 | World Int. Prop. O. | 374/159 |

Primary Examiner—William A. Cuchlinski, Jr.
Assistant Examiner—Diego F. F. Gutierrez
Attorney, Agent, or Firm—Anthony G. Eggink

[57] ABSTRACT

A dual temperature indicator providing visual indications when exposed to predetermined high or low temperatures. The indicator has a bulb with a capillary tube and an attached high temperature indicator structure. The bulb has a first liquid which also fills a predetermined portion of the tube. A separating substance and a second miscible liquid further fills a predetermined portion of the remainder of the tube. At a predetermined low temperature, the liquid in the bulb contracts causing the separating substance and a portion of the second liquid to move into the bulb to produce a visible color change. The high temperature indicator structure has an indicating member in contact with the capillary tube end and which provides a visual indication at a predetermined high temperature when the liquids expand upon an environmental temperature increase.

25 Claims, 3 Drawing Sheets

DUAL TEMPERATURE INDICATOR

BACKGROUND OF THE INVENTION

The present invention refers to and incorporates U.S. Pat. No. 4,457,252 issued Jul. 3, 1984 to Manske, Applicant of this patent application. The present invention relates to improvements of temperature indicators and provides for the detection of predetermined upper limit temperatures as well as predetermined lower limit temperatures, as disclosed in the U.S. Pat. No. 4,457,252. Particularly, this invention relates to a dual temperature indicator which provides an irreversible visual signal that it has been exposed to a temperature below a predetermined critical extreme, e.g. the freezing point of water, or exposed to a temperature above a predetermined critical extreme, e.g. 95 degrees Fahrenheit. The device of this invention is particularly useful for accompanying shipments of perishable or temperature sensitive products, such as pharmaceutical supplies or produce. The device provides a rapid and irreversible indicator so that the user is alerted to a past frozen or abnormally high temperature condition, even if that condition does not presently exist.

U.S. Pat. No. 4,457,252, CRITICAL TEMPERATURE INDICATOR, discloses an indicating device that visibly shows an irreversible color change when the temperature drops below a predetermined critical extreme. The art disclosed in the patent was exercised by 3M, and was manufactured and sold under the name "3M MonitorMark Coldside Indicator". Another device, "ColdMark Freeze Indicators" is manufactured and sold by IntroTech Inc. under license from 3M Co. However, these indicators only indicate low temperature extremes. Pharmaceutical customers, for example, use ColdMark Indicators to provide a visual indication if the temperature drops below a critical temperature, e.g. 32 degrees F., which inactivates their product. However, excessively high temperatures, e.g. 100 degrees F., may also inactivate their product. Therefore, in the warmer seasons users must utilize a different type of indicator which will provide an irreversible signal if the temperature goes above a predetermined critical level.

Despite the need for a dual critical temperature indicator device in the art, which gives a visible reading to the user of the occurrence of both temperature extremes, and which overcomes the limitations and problems of the prior art, none insofar as is known has been proposed or developed.

Accordingly, it is an object of the present invention to provide a device for the detection and recording of high and low temperature extremes, that can be attached to shipments of temperature sensitive goods and which will overcome prior art limitations and defects.

SUMMARY OF THE INVENTION

The present invention provides a dual temperature indicator which produces a visual, irreversible indication that the device has been subjected to selected critical temperatures at two predetermined temperature extremes.

The device includes a thermometer-like bulb and capillary tube. The bulb and a portion of the tube is filled at ambient temperatures with a colorless organic compound which is separated within the capillary tube from a dyed organic compound either by a very small amount of liquid which is not miscible with either of the organic compounds, or by a solid plug. The organic compound contained in the bulb has the characteristic of undergoing a volume reduction, i.e., approximately 10 percent, upon solidification and its volume at room temperature is selected so that the separating liquid or plug is drawn to the opening of the bulb, but not into the bulb, as the organic compound approaches its solidification temperature. At the solidification temperature, the organic compound in the bulb undergoes a sudden volume reduction which draws the separating liquid or plug and the dyed organic compound into the bulb. The two organic compounds mix and the bulb assumes the color of the dye. Thus, a rapid visual indication is given that the solidification temperature of the organic compound contained in the bulb has been reached. The organic compounds do not separate upon subsequent heating, so the dye remains in the bulb, thus providing an irreversible, continuous indication that the solidification temperature was reached.

At the other end of the temperature range, e.g. 95 degrees F. or higher, the dyed organic compound in the capillary tube is expelled out the narrow end of the tube. By placing a high temperature indicator device against the opening at the other end of the capillary tube, the dyed liquid expelled from the tube at high temperatures is absorbed into the high temperature indicator device and becomes readily visible to the user. To allow this effect to work at various specified high temperatures, the glass bulb and the capillary tube of the dual critical temperature indicator are filled by an alternating heating and cooling process. If the final temperature of the indicator before removing it from the oven to room temperature, is 127.4 degrees F. (53 degrees C.), for example, then, in any subsequent use of the indicator, the dyed second organic liquid will just reach the end of the capillary tube opening if the temperature again rises to 127.4 degrees F. Any temperature above this level will cause some of the dyed liquid to be expelled out of the tube onto the high temperature indicator device where it will be readily visible. This high temperature irreversible visual signal can be set to other desired temperatures by controlling the final oven temperature. For example, if a high temperature signal is desired whenever the temperature goes above 100 degrees F., the glass tube being filled in production is left in the oven (with the open tube end immersed under the dyed liquid) until the temperature is 100 degrees F. Then removal to room temperature and addition of a high temperature indicating device results in an indicator that can at one end irreversibly signal that the temperature has dropped below a predetermined level (as described in U.S. Pat. No. 4,457,252), and at the other end can signal that the temperature has gone above 100 degrees F.

These and other benefits of this invention will become clear from the following description by reference to the drawings.

DESCRIPTION OF THE PREFERRED EMBODIMENTS

Figure 1:
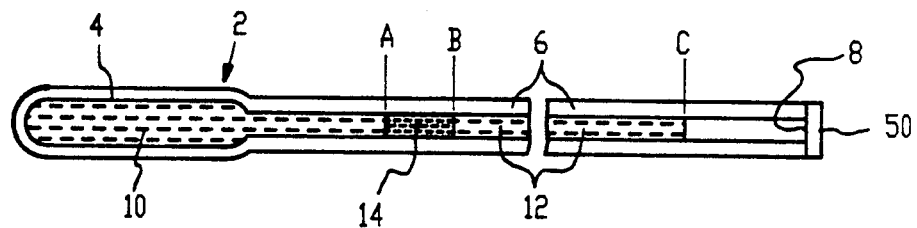
FIG. 1 is a longitudinal cross-sectional view of a dual temperature indicator according to the present invention.

Referring to FIG. 1, a dual critical temperature indicator 2 is shown according to the present invention. The indicator 2 is thermometer-like in construction and includes a hollow bulb portion 4 and a communicating capillary tube portion 6. A high temperature indicator 50 is shown connected at end 8 of the capillary tube 6.

The indicator 2 may be constructed of glass or plastic by conventional techniques used to construct thermometers. Constraints necessary for the construction of the indicator 2 are that the volume of the bulb 4 be significantly greater than the volume of the bore of the capillary tube 6 and that the bulb portion 4 of the indicator 2 be transparent.

FIG. 1 shows an organic compound 10, preferably colorless and having a predetermined solidification temperature, filling bulb 4 and a portion of tube 6 up to the line denoted "A". A second organic compound 12 having a dye which colors the compound 12 fills tube 6 between lines or levels denoted "B" and "C". A separating compound 14 is shown between lines "A" and "B".

The colorless organic compound 10 has the physical property of a relatively large volume reduction of preferably 8 to 11 percent upon solidification. Fatty acid esters have been found to exhibit this characteristic, and particularly suitable organic compounds and their respective solidification temperatures are listed below in Table I.

TABLE I

| ORGANIC COMPOUND | SOLIDIFICATION TEMPERATURE in DEGREES F. (C.) |
| --- | --- |
| Octyl Caprylate | −1.3 (−18.5) |
| Heptyl Caprylate | 1.4 (−17) |
| Hexyl Laurate | 11.3 (−11.5) |
| Octyl Caprate | 25.7 (−3.5) |
| Butyl Myristate | 32 (0) |
| Isopropyl Myristate | 23.9 (−4.5) |
| Decyl Caprate | 42.8 (6) |
| Ethyl Myristate | 44.6 (7) |
| Isopropyl Palmitate | 50 (10) |
| Lauryl Caprate | 67.1 (19.5) |
| Butyl Stearate | 68.9 (20.5) |
| Decyl Myristate | 70.7 (21.5) |
| Octadecyl Acetate | 84.2 (29) |
| Lauryl Palmitate | 95.9 (35.5) |
| Cetyl Palmitate | 120.2 (49) |

As will be further described, a predetermined lower limit temperature is visually indicated by a color change in bulb 4 when organic compound 10 mixes with a dye.

Although the indicator 2 will be described, for convenience, as operating at the lower limit of 32 degrees F. (0 degrees C.), this will be true only if butyl myristate is selected as compound 10. The indicator 2 can operate at any temperature listed in Table I by substituting the corresponding chemical in the bulb 4. Because most organic compounds have the property of volume reduction upon solidification, a wide range of operating temperatures is possible. Table I illustrates some of the possible compounds which may be used and is not intended to limit the invention to those compounds.

The colored organic compound 12 may be any compound miscible with organic compound 10 and which has a solidification temperature lower than that of compound 10. Any of the compounds listed in Table I are suitable and it has been found that trioctyl phosphate and bis(2-ethyl-hexyl) phthalate are suitable as well. The dye used to color the organic compound 12 may be any dye which is compatible with and will dissolve in the compound 12. Waxolene Violet BA, available from ICI United States, Inc. has been found to be a particularly suitable dye.

A separating substance 14 is located between organic compounds 10 and 12 in the capillary tube 6 between the lines denoted "A" and "B" in FIG. 1. The required characteristics of the separating liquid 14 are that its solidification temperature must be lower than that of the organic compound 10 and that it be immiscible with organic compounds 10 and 12. It has been found that glycols and preferably ethylene glycol are well suited as a separating substance. A saturated solution of nickel II nitrate in water has also been found to fulfill these requirements, and perflourocarbon compounds, which are completely fluorinated organic compounds such as those manufactured by the 3M Company under the trademark "FLOURINERT", or other aqueous solutions of salts, such as ammonium chloride, calcium chloride, iron chloride, lithium chloride, potassium bromide, potassium chloride, potassium iodide, sodium bromide, sodium chloride, or sodium nitrate have also been found to work. It is also contemplated that an air bubble, a solid plug of Teflon, wood, or other material, or the like could replace the separating liquid 14 so long as the plug is sized to seal but slide within the tube 6. However, the invention will be described as if a liquid is used to separate the organic compounds 10 and 12.

The respective volume of organic compounds 10 and 12 and the separating liquid 14 depend upon the dimensions of the temperature indicator 2 and may be accurately calculated when these dimensions are known. The bore diameter of the capillary tube 6 is preferably 0.020 to 0.040 inches (0.5 to 1.0 mm), and, thus, these compounds are not easily injected into the indicator 2, but may be introduced by alternately heating and cooling the indicator 2 to draw the desired compound into the capillary tube 6. For example, to produce an indicator having an upper critical temperature of 127.4 degrees F., the preferred procedure to fill a bulb 4 having a volume of 0.006 fluid ounces (0.190 ml) and a capillary 6 having a diameter of 0.020 inches (0.5 mm) and a length of 2.36 inches (60 mm) is first to evacuate the indicator 2, then immerse the opening 8 in the colorless compound 10, and allow air pressure to force the compound 10 into the indicator 2 to fill it completely. Next, the indicator 2 is heated to 193.1 degrees F. (89.5 degrees C.) causing some of the compound 10 to be expelled out the open end 8 due to volume expansion of compound 10. Then, the open end 8 is immersed in the desired separating liquid 14, and the temperature is lowered to 187.7 degrees F. (86.5 degrees C.). Next, the opening 8 is immersed in the desired dye compound 12 and the temperature of the indicator 2 is lowered to 127.4 degrees F. (53 degrees C.), or to just below whatever temperature is desired as the upper temperature limit. Finally, the indicator 2 is removed from the dye compound 12 and allowed to cool at room temperature. It is important that between each step that any excess liquid or compound be wiped from the opening 8.

Using the upper 127.4 degrees F. temperature limit (53 degrees C.), the above procedure results in level "A" being approximately 1.86 inches (47.3 mm) from the opening 8, a distance between levels "A" and "B" of approximately 0.063 inches (1.59 mm), and a distance between levels "B" and "C" of approximately 1.0 inch (25.4 mm). Thus, in this configuration, the total volume of all three liquids is over one hundred times the volume of the second liquid 12 (98.2 percent bulb liquid 10, 0.95 percent separating liquid 14, and 0.85 percent second liquid 12). Therefore, it is primarily the relative greater volume of liquid 10 that results in the linear movement of liquid in tube 6 due to temperature change.

In operation, the liquid levels "A", "B" and "C" will be maintained at constant temperature, but will move either toward the high temperature indicator 50 or the bulb 4 as the indicator 2 is heated or cooled. The volumes of the liquids 10, 12 and 14 are such that level "C" does not move past the tube end 8 of the capillary tube 6 at expected storage temperature and that level "A" approaches but does not reach the bulb 4 when the temperature of the indicator 2 is near the solidification temperature of the compound 10. When the solidification temperature of compound 10 is reached, the volume reduction of the compound 10 draws the separating liquid 14 and most or all of the dyed compound 12 into the bulb 4.

As discussed above, it is necessary that the separating liquid 14 and the dyed compound 12 have solidification temperatures lower than the colorless compound 10 so that they are drawn into the bulb 4 rather than solidifying within the capillary tube 6. Even though the two organic compounds 10 and 12 may not immediately mix completely when the dyed compound 12 is drawn into the bulb 4 because the colorless compound 10 has solidified, presence of the dyed compound 12 in the bulb 4 provides a visual indication that the solidification temperature of the colorless compound 10 has been reached.

Conversely, when the upper temperature limit is reached, the volume expansion of the liquids causes some, or all, of compound 12 to be expelled out of the opening 8 and to be absorbed, for example, by the high temperature indicator 50 causing it to change color. The resultant color change provides an irreversible visual indication that the temperature of the indicator 50 has reached or exceeded the upper temperature limit. Since the bulb 4 and the capillary tube 6 are filled by alternately adjusting the environmental pressure and heating and cooling as described above, the volume expansion of the compounds at higher temperatures is accounted for in determining the initial fill volume of compound 12.

As an operative example, an indicator 2 having the dimensions indicated above and containing butyl myristate as the colorless compound 10, trioctyl phosphate colored with Waxolene Violet BA as the dyed compound 12, and a saturated aqueous solution of nickel nitrate as the separating liquid 14 to the levels described above was cooled to 39.2 degrees F. (4 degrees C.). At this temperature the level "B" was drawn to within approximately 0.125 inches (3.2 mm) of the bulb 4, but no indication of freezing was provided. When the indicator 2 was cooled to 32 degrees F. (0 degrees C.) all of the dyed compound 12 was drawn into the bulb 4.

In the preceding example, indicator 2 is stable at temperatures between the solidification temperature of the colorless compound 10 and the predetermined high temperature limit of compound 12. A visual indication is provided at either the solidification temperature of compound 10 or at the predetermined high temperature limit at which compound 12 starts being expelled from opening 8, as will be further described.

Figure 2A:
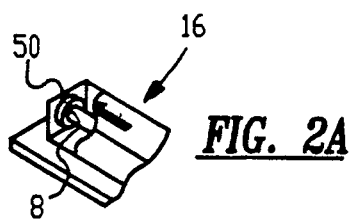
FIG. 2A is a partial cutaway view of one end of the indicator of FIG. 2.
Figure 2:
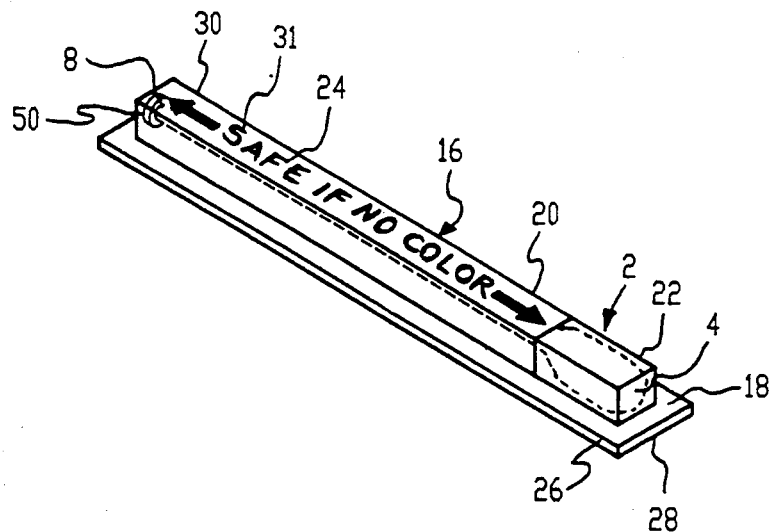
FIG. 2 is a perspective view of an indicator housing containing a dual temperature indicator of the invention.

FIG. 2 illustrates a housing structure 16 having the critical temperature indicator 2 therein and which will permit attachment to an item to be monitored, such as a package containing temperature sensitive pharmaceutical products or the like. The housing 16 includes a base 18 and a raised portion 20 which contains and protects the critical temperature indicator 2. Housing end 22 is transparent providing for observation of the critical temperature indicator bulb 4. The raised portion 20 of the housing 16 further includes a legend 24 which indicates that if the bulb 4 is colorless, the solidification temperature of the compound 10 within the critical temperature indicator 2 has not been reached. Similarly, housing end 30 is a raised portion having a transparent portion 31 providing observation of the high critical temperature indicator 50 at the tube end 8. If the high critical temperature indicator 50 is colorless, the high temperature limit of the indicator 2 has not been reached. The underside of the base 18 is coated with a pressure-sensitive adhesive 26 which is protected by a removable release liner 28. The indicator housing 16 may be attached to an article by removing the liner 28 and pressing the adhesive 26 against the article. Color within the bulb 4 thus provides a visual indication through the transparent end 22 of the housing 16 that the article has been subjected to a predetermined temperature limit below the solidification temperature of the selected compound 10, and/or color in the high critical temperature indicator 50 provides visual indication through the transparent portion 31 that the article has been subjected to a predetermined high critical temperature extreme. FIG. 2A is a cutaway view showing the indicator 50, positioned at tube end 8 inside the housing 16. As will be further described below, the indicator 50 is positioned against the tube end and may be comprised of an absorbent material, including a paper disc, i.e., a white paper disc, an absorbent plastic disc, or an absorbent coating, i.e., a white absorbent coating placed on either a paper or plastic disc.

Figure 3:
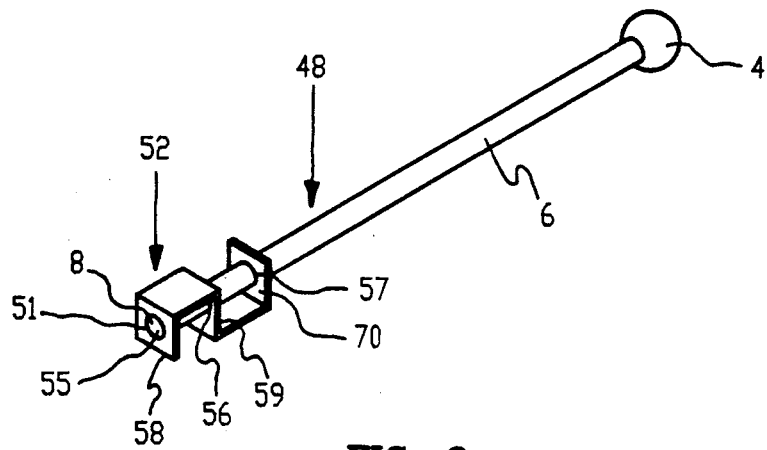
FIG. 3 is a perspective view of another embodiment of a dual temperature indicator.

FIG. 3 shows a dual critical temperature indicator 48 having a paper indicator disc 51 held against the end 8 of capillary tube 6 by a plastic clip holder 52. Clip holder 52 is a bracket structure having three parallel legs, 58, 59 and 70, each leg having aperture 55, 56, and 57, respectively, for frictionally holding tube 6. These indicators are made using a preferably white paper disc 51 and setting the high temperature limit levels at different desired temperatures (e.g. 90, 95, 100 degrees F. etc.) using the following method. The glass bulb 4 and capillary tube 6 of indicator 2 are filled as previously described. If for example, the final temperature of the indicator before removing it from the oven to room temperature is 127.4 degrees F. (53 degrees C.), then in any subsequent use of the indicator, the dyed organic liquid 12 will just reach the end of the capillary tube 8 opening if the temperature again rises to 127.4 degrees F. Any temperature above this level will cause some of the dyed liquid to be expelled out of the tube end 8 and be absorbed by the paper indicator disc 51 where it will be readily visible. Thus, the high temperature irreversible visual signal can be set at any desired temperature by controlling the final oven temperature to that temperature level. For example, if a 100 degree F. high temperature signal is desired, the glass tube 6 being filled in production is left in the oven with the open tube end immersed under the dyed liquid until the temperature is 100 degrees F. Then removal to room temperature and addition of a paper indicator disc 51, for example, results in an indicator that can at one end irreversibly signal that the temperature has dropped below a predetermined level, and at the other end can signal that the temperature has gone above 100 degrees F.

Figure 4:
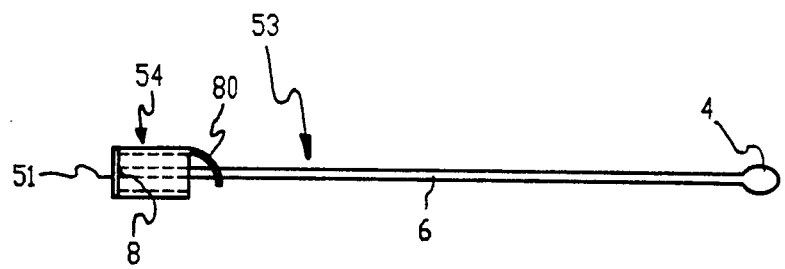
FIG. 4 is a longitudinal view of another embodiment of a dual temperature indicator.
Figure 5:
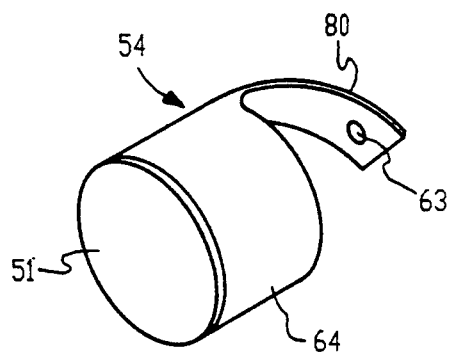
FIG. 5 is a perspective view of the high temperature indicator holding structure of FIG. 4.
Figure 8:
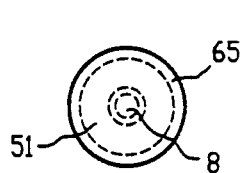
FIG. 8 is an end view of the high temperature indicator structure shown in FIG. 5.

FIG. 4 shows the dual critical temperature indicator 53 having a plastic clip structure 54 with a paper disc 51 sealed on one end and attached at end 8 of capillary tube 6 by means of tab 80. Clip holder 54 is further shown in FIGS. 5 and 6 to have outer cylindrical wall 64, wall end surface 65, and tab 80 extending therefrom for the purpose of receiving tube 6 through aperture 63. FIG. 8 is an end view of the embodiment of FIG. 5 and shown in contact with tube end 8. Using a ¼ inch diameter paper disc 51, for example, at one end of clip 54, a clear vivid permanent color results when the temperature goes above the pre-set high critical temperature level.

Figure 6:
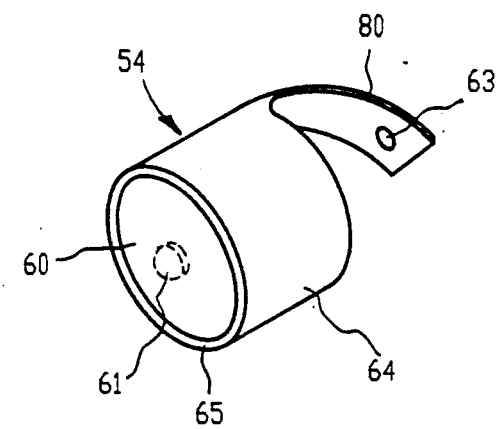
FIG. 6 is a perspective view of another holding structure embodiment.
Figure 9:
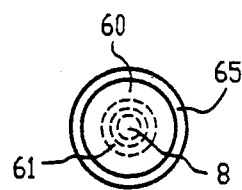
FIG. 9 is an end view of the high temperature indicator structure shown in FIG. 6.

FIG. 6 illustrates a clip 54 embodiment having a transparent plastic disc 60 that snaps into place via a forced friction fit into the end of cylindrical wall 64. An absorbent coating spot 61, such as absorbent ink, is imprinted on the inside center surface of disc 60 where tube end 8 bears against the disc 60. The coated spot 61 absorbs the compound 12 causing it to change color which is readily visible to an observer and indicates that the high critical temperature has been reached. FIG. 9 is an end view of FIG. 6 and which shows the tube end 8 placed against the coating 61 of disc 60.

Figure 7:
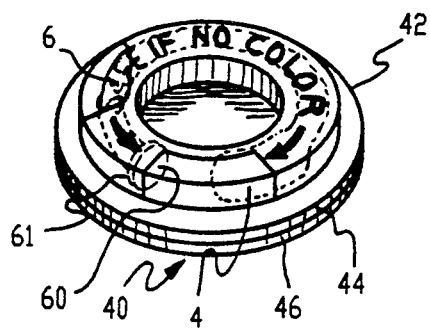
FIG. 7 is a perspective view of another embodiment of a dual temperature indicator of this invention.

FIG. 7 illustrates a dual critical temperature indicator 40 wherein the high and low indicators are contained and protected within a circular housing 42. The housing 42 may be attached to an article by means of a pressure-sensitive adhesive 44 covered by a removable liner 46. In this circular configuration, the low temperature indicator bulb 4 and the disc 60 with coating 61 placed against the tube end high temperature indicator are shown adjacent to each other. This embodiment illustrates that many shapes of the dual critical temperature indicator are possible, so long as the volumetric relationship between the bulb 4 and the capillary tube 6 is retained and a high temperature indicator, such as disc 60 with coating 61, is provided at the tube end. Within the housings 16 (FIG. 2) and 42 (FIG. 7) an insulating material (not shown) preferably surrounds the capillary tube portions to prevent the compound 10 within the tube from solidifying before the compound 10 within the bulb. Preferably, the insulating material will also cushion the indicator from shock during transport. The housings 16 and 42 preferably have a length whereby the bulb and tube structure and the clip structures shown and described are held therein. Thus, the dimensions of the housings can be utilized to further secure the upper temperature indicator elements in contact with the end 8 of the tube 6.

Figure 10:
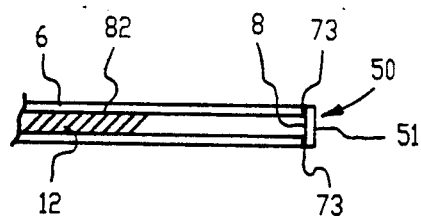
FIGS. 10-14 are lateral cross-sectional views showing embodiments of the high temperature indicator structures.
Figure 11:
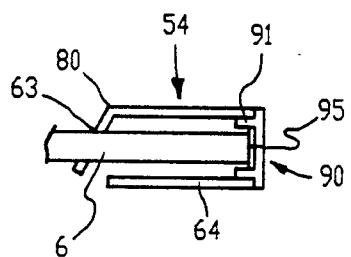
Figure 12:
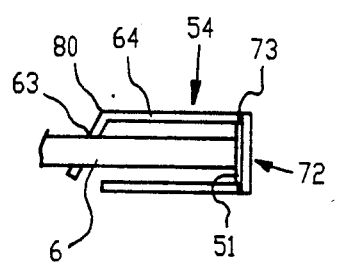
Figure 13:
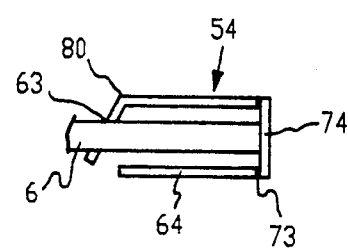

FIGS. 10-14 illustrate various embodiments of the high temperature indicator structures of this invention. FIG. 10 is a longitudinal cross-sectional view of the high temperature indicator 50 end showing paper disc 51 sealed to the tube wall 82 of tube end 8 by adhesive 73. FIG. 11 is a lateral cross-sectional view of a high temperature indicator end member 90 being frictionally fitted into clip 54 by a circumferential leg 91. Absorbent surface 95 is a coating on the inside surface of end 90 which produces a visual color change upon contact with liquid compound 12. To readily see a color change on 95 it is preferred that the clip structure 54 and end 90 be transparent. FIG. 12 shows a plastic disc 72 sealed by adhesive 73 to the end of clip body 54. An indicator disc 51, i.e. paper, is shown positioned against the inside of disc 72. FIG. 13 shows clip 54 having a high temperature indicator, such as bond paper 74, sealed to one end of wall 64. The seals 73 discussed can be heat seals or adhesive seals at the periphery of the paper 74. The paper indicator 74 is positioned to absorb the colored compound 12 when the upper critical temperature is reached.

Figure 14:
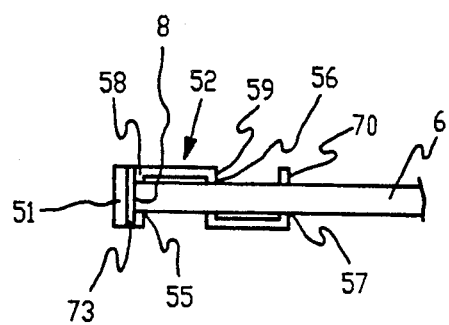

FIG. 14 shows high temperature indicator embodiment 52 wherein paper disc 51 is glued to leg 58 of clip 52 by adhesive 73. The end 8 of tube 6 is held in contact with paper disc 51 by the frictional fit of tube 6 in apertures 55, 56, and 57. Conversely, the high temperature indicators as depicted in FIGS. 11 and 13 can be arranged on clip 52 or tube 6 in order to enable other embodiments of the invention.

As shown and described above, although the indicator 2 can be used as a dual temperature indicator, the teachings of this invention can also be used to provide temperature indicator structures to detect either low or high critical temperatures. Thus, indicator 2 can be designed without compound 10 and without the separating means 14 when it is desired to have an indicator which detects only the high critical temperature limit.

Although the upper and lower temperature indicating structures of this invention have been shown and described to utilize visual color changes due to the use of dyed liquids and absorbent materials, such as paper and coatings, it is within the purview of this invention to provide first and second liquids which yield a color change due to chemical reaction. For example, the mixing of the first and second liquid in bulb 4 can chemically produce a visual color change therein to indicate a predetermined low temperature. Further, the reaction of the second liquid with an approximate chemically coated paper or an impregnated paper can chemically produce a visual color change at the upper temperature indicator structure.

From the foregoing descriptions of the exemplified embodiments, it will be apparent that many modifications may be made therein. It will be understood, therefore, that the embodiments are intended as illustrations of the invention only and that the invention is not limited thereto. It is intended in the appended claims to cover all such modifications as fall within the true scope of the invention.

That which is claimed is:

1. A dual temperature indicator providing visual indications at predetermined low and high temperatures comprising:

a) a transparent capillary tube having a bulb and a tube end;

b) said bulb having a specified bulb volume and said tube having a specified tube volume, said bulb volume being greater than said tube volume;

c) a first liquid filling said bulb and extending into said tube and having the property of volume reduction upon solidification upon reaching a predetermined low temperature;

d) a second liquid in said tube and being miscible with said first liquid, and having a solidification temperature lower than that of said first liquid;

e) low temperature indicating means to provide a visual signal at said predetermined low temperature;

f) separating means interposed between said first and second liquids for preventing mixing thereof within said tube, said first liquid and said separating means having a combined volume whereby upon solidification of said first liquid said combined volume is less than said bulb volume so that said separating means and at least a portion of said second liquid are drawn into said bulb upon solidification of said first liquid to provide said lower temperature visual indication signal at said predetermined low temperature;

g) high temperature indicating means located at said tube end and having visual signal means activatable at a predetermined high temperature; and h) means to fix said high temperature indicating means at said tube end, said first and second liquids and said separating means having combined volumes greater than the combined volumes of said tube and said bulb at said predetermined high temperature, whereby said second liquid is expelled from said tube end to said high temperature indicating means to provide a visual indication at said predetermined high temperature.

2. The dual temperature indicator of claim 1, wherein said high and low temperature indicating means comprise a dye in solution with said second liquid.

3. The dual temperature indicator of claim 2, wherein said dye is Waxolene Violet BA.

4. The dual temperature indicator of claim 1, wherein said first and second liquids are organic compounds.

5. The dual temperature indicator of claim 4, wherein said first and second liquids are fatty acid esters.

6. The dual temperature indicator of claim 4, wherein said first liquid is selected from the group consisting of octyl caprylate, heptyl caprylate, hexyl laurate, octyl caprate, butyl myristate, isopropyl myristate, decyl caprate, ethyl myristate, isopropyl palmitate, lauryl caprate, butyl stearate, decyl myristate, octadecyl acetate, lauryl palmitate, and cetyl palmitate.

7. The dual temperature indicator of claim 4, wherein said second liquid is selected from the group consisting of octyl caprate, heptyl caprylate, hexyl laurate, octyl caprate, butyl myristate, isopropyl myristate, decyl caprate, ethyl myristate, isopropyl palmitate, lauryl caprate, butyl stearate, decyl myristate, octadecyl acetate, lauryl palmitate, cetyl palmitate, trioctyl phosphate, and bis (2-ethyl-hexyl)phthalate.

8. The dual temperature indicator of claim 1, wherein said separating means is an aqueous salt solution.

9. The dual temperature indicator of claim 8, wherein said salt is selected from the group consisting of ammonium chloride, calcium chloride, iron chloride, lithium chloride, potassium bromide, potassium chloride, potassium iodide, sodium bromide, sodium chloride and sodium nitrate.

10. The dual temperature indicator of claim 1, wherein said separating means is selected from the group consisting of a perflourocarbon, a saturated solution of nickel II nitrate in water, a solid plug movable within said capillary tube, and glycol.

11. The dual temperature indicator of claim 10, wherein said glycol is ethylene glycol.

12. The dual temperature indicator of claim 1, wherein said high temperature indicating means comprises an absorbent paper disc for absorbing said second liquid upon reaching said predetermined high temperature.

13. The dual temperature indicator of claim 1, wherein said high temperature indicator means comprises an absorbent disc and wherein said means to fix is comprised of a clip having a body having one end for mounting to said tube end and an opposite end having said absorbent disc mounted thereto for contact with said tube end.

14. The dual temperature indicator of claim 13, wherein said clip body further comprises a bracketed structure having a plurality of parallel legs and wherein each said leg has an aperture for frictionally receiving said tube.

15. The dual temperature indicator of claim 13, wherein said clip body further comprises a hollow cylinder having a tab member extending from said cylinder at said one end, said tab member further having an aperture for receiving and holding said tube.

16. The dual temperature indicator of claim 1, wherein said high temperature indicating means comprises a disc member positioned at said tube end, said disc member further having an absorbent surface for absorbing said second liquid upon reaching said predetermined high temperature.

17. The dual temperature indicator of claim 16, wherein said absorbent surface includes an absorbent ink.

18. The dual temperature indicator of claim 16, wherein said means to fix is comprised of a clip body for holding said disc member and having an end constructed and arranged wherein said disc member frictionally fits into said clip body.

19. The dual temperature indicator of claim 1, wherein said means to fix said high temperature indicating means comprises a housing having an absorbent surface, said housing being constructed and arranged for holding said absorbent surface against said tube end.

20. The dual temperature indicator of claim 19, wherein said absorbent surface includes an absorbent ink.

21. The dual temperature indicator of claim 19, wherein said absorbent surface is a white paper disc.

22. The dual temperature indicator of claim 19, wherein said absorbent surface includes a white absorbent coating.

23. The dual temperature indicator of claim 1, wherein:

a) said first liquid comprises approximately 98.2 percent of the total dual indicator volume;

b) said second liquid comprises approximately 0.85 percent of the total dual indicator volume; and c) said separating means comprises approximately 0.95 percent of the total dual indicator volume.

24. An improved critical temperature indicator of the type having a transparent capillary tube with a closed hollow bulb at one end and an open opposite end, said hollow bulb having a specified volume and said tube having a volume less than said bulb, a first liquid filling said bulb and extending into said tube, a separating means, and a second liquid located at said opposite end of said tube, said second liquid being separated from said first liquid by said separating means, said first liquid being miscible with said second liquid, said first liquid and said separating means having a combined volume being less than said bulb volume upon solidification of said first liquid, whereby said separating means and at least a portion of said second liquid are drawn into said bulb upon solidification of said first liquid to provide a first critical temperature indicator means, wherein the improvement comprises a second critical temperature indicator means and means to fix said second temperature indicator means to said tube opposite end, whereby said second liquid flows to aid open opposite end of said tube upon reaching a predetermined high temperature and whereby said second critical temperature indicator means is positioned adjacent said open opposite end of said tube for detecting and providing a visual indication caused by the expulsion of said second liquid out of said tube opposite end to said second critical temperature indicator means when said second liquid reaches said predetermined high temperature.

25. A dual temperature indicator providing visual indications at predetermined low and high temperatures comprising:
   a) a transparent capillary tube having a bulb and a tube end;
   b) said bulb having a specified bulb volume and said tube having a specified tube volume, said bulb volume being greater than said tube volume;
   c) a first liquid filling said bulb and extending into said tube and having the property of volume reduction upon solidification upon reaching a predetermined low temperature;
   d) a second liquid in said tube and being miscible with said first liquid, and having a solidification temperature lower than that of said first liquid;
   e) low temperature indicating means to provide a visual signal at said predetermined low temperature;
   f) separating means interposed between said first and second liquids for preventing mixing thereof within said tube, said first liquid and said separating means having a combined volume whereby upon solidification of said first liquid said combined volume is less than said bulb volume so that said separating means and at least a portion of said second liquid are drawn into said bulb upon solidification of said first liquid to provide said lower temperature visual indication signal at said predetermined low temperature;
   g) high temperature indicating means located at said tube end comprising absorbent visual signal means activatable at a predetermined high temperature; and
   h) means to fix said high temperature indicating means at said tube end, said first and second liquids and said separating means having combined volumes greater than the combined volumes of said tube and said bulb at said predetermined high temperature, whereby said second liquid is expelled from said tube end to said high temperature indicating means to provide a visual indication at said predetermined high temperature.

* * * * *